(12) United States Patent
Carlstedt

(10) Patent No.: US 8,365,930 B2
(45) Date of Patent: Feb. 5, 2013

(54) RAILCAR DRAFT GEAR SPRING ASSEMBLY AND METHOD OF MAKING AN ELASTOMERIC SPRING UNIT

(75) Inventor: Richard A. Carlstedt, Wheaton, IL (US)

(73) Assignee: Miner Enterprises, Inc., Geneva, IL (US)

( * ) Notice: Subject to any disclaimer, the term of this patent is extended or adjusted under 35 U.S.C. 154(b) by 269 days.

(21) Appl. No.: 12/927,593

(22) Filed: Nov. 17, 2010

(65) Prior Publication Data

US 2012/0118847 A1    May 17, 2012

(51) Int. Cl.
B61G 9/04    (2006.01)

(52) U.S. Cl. .................... 213/44; 213/40 D; 213/40 S

(58) Field of Classification Search ............ 213/22, 213/23, 26, 29, 30, 40 R, 40 D, 40 S, 44, 213/45, 46 A, 46 R, 49
See application file for complete search history.

(56) References Cited

U.S. PATENT DOCUMENTS

| | | | | |
|---|---|---|---|---|
| 2,713,483 | A | * | 7/1955 | Tillou ........................... 267/153 |
| 2,713,485 | A | * | 7/1955 | Tillou ........................... 267/141.1 |
| 2,763,379 | A | * | 9/1956 | Danielson ...................... 213/45 |
| 2,764,300 | A |   | 9/1956 | Withall |
| 2,841,292 | A |   | 7/1958 | Campbell |
| 3,465,900 | A | * | 9/1969 | Cope et al. ..................... 213/22 |
| 3,491,898 | A | * | 1/1970 | Suckow .......................... 213/27 |
| 3,759,400 | A | * | 9/1973 | Cope .............................. 213/22 |
| 3,966,057 | A |   | 6/1976 | Duquette et al. |
| 4,198,037 | A |   | 4/1980 | Anderson |
| 4,556,149 | A |   | 12/1985 | Carlstedt |
| 4,576,295 | A |   | 3/1986 | Carlstedt |
| 4,735,328 | A |   | 4/1988 | Carlstedt |
| 4,960,215 | A |   | 10/1990 | Carlstedt |
| 5,351,844 | A |   | 10/1994 | Carlstedt |
| 6,478,173 | B2 |   | 11/2002 | Carlstedt |
| 6,488,162 | B1 |   | 12/2002 | Carlstedt |
| 7,624,884 | B2 |   | 12/2009 | Palermo et al. |

* cited by examiner

Primary Examiner — S. Joseph Morano
Assistant Examiner — Zachary Kuhfuss
(74) Attorney, Agent, or Firm — Law Office of John W. Harbst

(57) ABSTRACT

A railcar draft gear spring assembly including an axial stack of spring units. Each spring unit is formed from a non-circular elastomeric preform having a series of spaced corners with recessed sides extending between the corners. The preform includes a lobe formed at each corner for channeling the flow of elastomer when the preform is compressed between a pair of non-circular metal plates. Each plate has an outer profile and a series of grippers extending in a common direction away from one surface of the plate. The grippers are arranged in a predetermined pattern relative to each other and relative to the preform for initially positioning the non-circular preformed block of copolyester elastomer relative to the plates and for thereafter restricting the flow of elastomer relative to the outer profile of the plates.

28 Claims, 10 Drawing Sheets

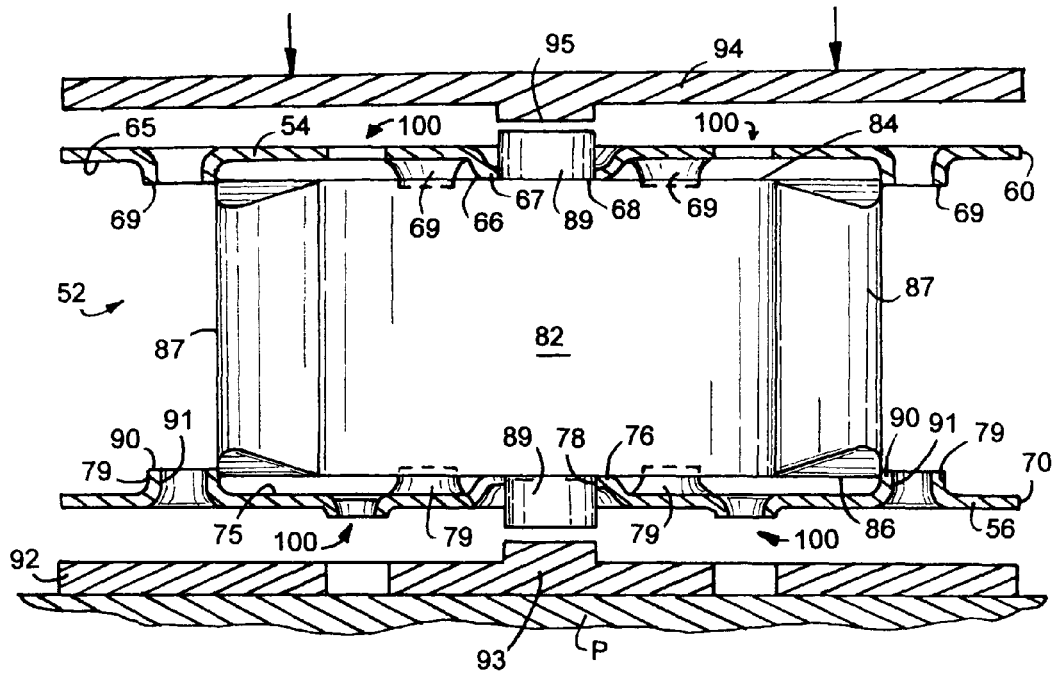
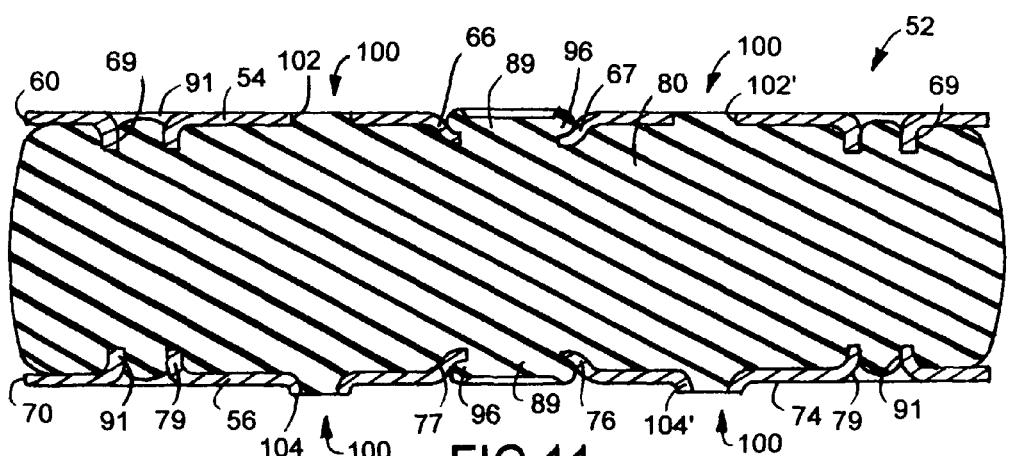
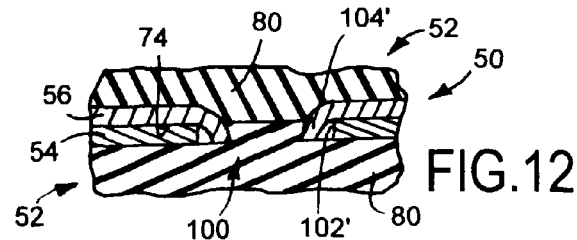

US 8,365,930 B2

RAILCAR DRAFT GEAR SPRING ASSEMBLY AND METHOD OF MAKING AN ELASTOMERIC SPRING UNIT

FIELD OF THE INVENTION DISCLOSURE

This invention disclosure generally relates to railcar draft gears used to absorb impacts between railcars and, more particularly, to a spring assembly used in combination with the railcar draft gear for cushioning impacts directed to the draft gear and a method of making an elastomeric spring unit for such a spring assembly.

BACKGROUND OF THE INVENTION DISCLOSURE

Railcar draft gears have been used for many years at opposite ends of a railcar to absorb and cushion impact forces. During assembly of a train consist, the impact loads and forces between two railcars can be substantial. That is, during assembly of a train consist, the impact loads between two railcars can be well in excess of 500,000 pounds. To operate in such environments, most railcar draft gears include a cast housing having an inwardly tapered bore at an open end, a spring assembly disposed within the housing, a series of metal friction shoes or members arranged in the tapered bore of the housing and movable against the spring upon compression of the draft gear, and a wedge disposed in operable combination with the friction members such that impact blows directed against the wedge are transferred axially to the spring and radially to the housing.

In earlier railcar draft gears, the spring assembly used one or more steel springs to absorb energy between two railcars. Later, the spring assembly was designed with a stacked series of individual spring units for absorbing the energy realized by the railcar draft gear; with each spring unit including a rubber spring sandwiched between two generally rectangular metal plates. More recently, other elastomeric materials have been used and accepted as replacements for steel and/or rubber springs. One elastomeric spring offering beneficial results is disclosed in U.S. Pat. No. 5,351,844 to R. A. Carlstedt and includes multiple circular or toroidally shaped elastomeric springs stacked in axial relation to each other.

Railcar manufacturers and suppliers for such railcar manufacturers are continually seeking methods and ways of enhancing spring performance while reducing manufacturing costs of railcars and the components used to build such railcars without having to sacrifice performance and quality. The draft gear housing wherein the spring is housed frequently has a generally rectangular cross-sectional configuration. As such, a circular or toroidal shape of the spring unit within a draft gear housing having a spring chamber formed with a generally rectangular cross-section in plan wastes valuable space which could otherwise be used by a spring to absorb energy. A non-circularly shaped or designed spring unit, however, also presents a unique series of challenges which are encountered during formation of the spring. Moreover, it is important for the elastomer of each spring unit to not extend or be squeezed from between the metal plates to an extent the elastomer extends beyond an outer profile of the plates and rubs or otherwise engages with the internal wall of the draft gear housing. Such rubbing contact can frequently damage the spring and adversely affect draft gear performance.

Thus, there is a continuing need and desire for a railcar draft gear spring assembly having a non-circular design which optimizes the space constraints of the draft gear housing and is capable of absorbing and dissipating the relatively high levels of energy typically encountered by a railcar draft gear during operation, then returning to its pre-operative length as the actuating force is removed from the draft gear.

BRIEF DESCRIPTION OF THE INVENTION DISCLOSURE

In view of the above, and in accordance with one aspect, there is provided a railcar draft gear spring assembly including an axial stack of spring units. Each spring unit is formed from a non-circular preformed block of copolyester elastomer of a given thickness defined between a pair of generally parallel flat surfaces and having a series of spaced corners with sides extending between the corners. The preformed block of copolyester elastomer further includes a lobe formed at each corner for channeling the flow of elastomer and recessed sides extending between any two lobes such that when said preformed block of copolyester elastomer is compressed to an extent of at least about fifty percent of the given thickness the preformed block of copolyester elastomer transmutes into the spring which spring, when subsequently put into service, as such will not suffer significant permanent deformation although a particular force is applied thereto. The spring assembly further includes a non-circular metal plate arranged in operable combination with each of the generally parallel surfaces of the non-circular preformed block of copolyester elastomer. Each plate has an outer profile and a series of grippers extending in a common direction away from one surface of the plate. The grippers are arranged in a predetermined pattern relative to each other and relative to the preform for initially positioning the non-circular preformed block of copolyester elastomer relative to the plates and for thereafter resisting the flow of elastomer relative to the outer profile of the plates.

In one form, the plates of each spring unit have a generally rectangular outer profile. Moreover, the plates of each spring unit furthermore preferably define cooperating interlocks for facilitating stacking and general alignments of one spring unit relative to another. Each gripper in the series of grippers defines steps angularly aligned relative to the surface of the plate from which the gripper extends. Additionally, each gripper in the series of grippers further defines an aperture into which elastomer flows and is held during axial compression of the preform.

Preferably, the elastomer of each spring unit has a Shore D durometer hardness ranging between about 38 and about 57. In a preferred embodiment, the elastomer of each spring unit has a ratio of plastic strain to elastic strain greater than 1.5 to 1. Preferably, each lobe on the preformed block of copolyester elastomer defines a slanted surface angling away from a respective flat surface for maintaining the surfaces generally flat after the preformed block of copolyester elastomer has been compressed.

According to another aspect, there is provided a railcar draft gear spring assembly including a series of spring units arranged in stacked relation relative to each other. Each spring unit includes a spring formed from a non-circular preformed block of copolyester elastomer of a given thickness defined between two generally flat opposed surfaces and has a series of spaced corners. The preformed block of copolyester elastomer has a generally centralized projection extending from each surface. The preformed elastomeric block further includes recessed sides extending between any two corners of the preformed block of copolyester elastomer such that when the preformed block of copolyester elastomer is compressed to an extent of at least about fifty percent of the given thickness, the preformed block of copolyester elastomer transmutes into the spring which spring, when subsequently put into service, as such will not suffer significant permanent deformation, although a particular force is applied thereto. Each spring unit further includes a non-circular metal plate arranged in operable combination with each of the generally flat surfaces of the non-circular preformed block of copolyester elastomer. Each plate has a longitudinal axis, an outer profile, and a series of grippers extending in a common direction from one surface of the plate; with at least two of the grippers being arranged to opposed lateral sides of the axis in a predetermined pattern relative to each other and relative to the preform for initially positioning the non-circular preformed block of copolyester elastomer relative to the respective plates and for thereafter restricting the flow of elastomer relative to the outer profile of the plates. Each plate further includes a generally centralized inwardly turned flange defining an aperture. The aperture in the flange is sized to receiving and permit the central projection extending from the associated flat surface of the preform to pass therethrough, whereby forming a mechanical interlock with the inwardly turned flange.

In one form, the plates of each spring unit have a generally rectangular outer profile. Preferably, two additional grippers are arranged on each plate in general alignment with the axis and relative to opposed ends of the preform for initially positioning the non-circular preformed block of copolyester elastomer relative to the plates and for thereafter restricting the flow of elastomer relative to the outer profile of the plates. Each gripper in the series of grippers preferably defines a step, angularly aligned relative to the surface of the plate from which the gripper extends. Each gripper in the series of grippers furthermore preferably defines an aperture into which elastomer flows and is held during axial compression of the preform. In another preferred form, the plates of each spring unit further define cooperating interlocks for facilitating stacking and general alignment of one spring unit relative to the other.

In one preferred embodiment, the elastomer of each spring unit has a Shore D durometer hardness ranging between about 38 and about 57. Moreover, the elastomer of each spring unit preferably has a ratio of plastic strain to elastic strain greater than 1.5 to 1. Preferably, the preformed block of copolyester elastomer includes a lobe at each corner for distributing the elastomer relative to the outer edges of the plates during formation of the spring. Each lobe on the preformed block of copolyester elastomer defines a slanted surface angling away from a respective flat surface for maintaining the surfaces generally flat after the preformed block of copolyester elastomer has been compressed.

According to another aspect, there is provided a method of manufacturing a railcar draft gear elastomeric spring unit, comprising the steps of: providing a first non-circular plate having first and second spaced and generally parallel planar surfaces, the non-circular first plate defining a longitudinal axis and a plurality of grippers arranged in a predetermined pattern relative to each other on the first plate, with at least two grippers being spaced equidistantly a predetermined lateral distance apart to opposed lateral sides of a longitudinal axis of the first plate; providing a second non-circular plate having third and fourth spaced and generally parallel planar surfaces, the non-circular second plate defining a longitudinal axis and a plurality of grippers arranged in a predetermined pattern relative to each other on the second plate, with at least two grippers being spaced equidistantly a predetermined lateral distance apart to opposed lateral sides of a longitudinal axis of the second plate; arranging a non-circular preformed block of copolyester elastomer of a given thickness between the second and fourth generally planar surfaces of the first and second plates, respectively, such that the grippers on the plates position the non-circular preformed block of copolyester elastomer relative to the plates, with the non-circular preformed block of copolyester elastomer having a series of spaced corners, and wherein the preformed block of copolyester elastomer further has recessed sides extending between the corners, and wherein the preformed block of copolyester elastomer further includes a lobe formed at each corner; and, compressing the preformed block of copolyester elastomer between the plates to an extent of at least about fifty percent of the given thickness to transmute the preformed block of copolyester elastomer into a spring which spring, when subsequently put into service, as such will not suffer significant permanent deformation although a particular force is applied thereto and with the lobes on the preformed block of copolyester elastomer balancing the distribution of elastomer toward the corners of the plates, and with the grippers on the plates engaging with the preformed block of copolyester elastomer whereby resisting the flow of elastomer relative to the outer profile of the plates.

Preferably, the method of manufacturing a railcar draft gear elastomeric spring unit further includes the step of: providing each plate of each spring with a generally rectangular outer profile. A preferred method of manufacturing a railcar draft gear elastomeric spring unit includes the further step of: configuring the plates of each spring unit to define cooperating interlocks for facilitating stacking and general alignment of one spring unit relative to another. Preferably, each gripper in the series of grippers defines a step angularly aligned relative to the surface of the plate from which the gripper extends. Moreover, each gripper in the series of grippers further defines an aperture into which elastomer flows and is held during compression of the preform. A preferred method of manufacturing a railcar draft gear elastomeric spring unit includes the further step of: configuring each plate to further include a generally centralized inwardly turned flange defining an aperture, with the aperture being sized to receive and permit a central projection extending from the associated flat surface of the preform to pass therethrough whereby forming a mechanical interlock with the inwardly turned flange.

A preferred method of manufacturing a railcar draft gear elastomeric spring unit includes the further step of: forming each spring from an elastomer having a Shore D durometer hardness ranging between about 38 and about 57. Preferably, the elastomer of each said spring has a ratio of plastic strain to elastic strain greater than 1.5 to 1. In one form, each lobe on the preformed block of copolyester elastomer defines a slanted surface angling away from a respective flat surface for maintaining the surfaces generally flat when the preformed block of copolyester elastomer is compressed. A preferred method of manufacturing a railcar draft gear elastomeric spring unit includes the further step of: forming the preformed block of copolyester elastomer to have a generally centralized projection extending from each flat surface.

BRIEF DESCRIPTION OF THE DRAWINGS

FIG. 10 is a sectional view of an elastomeric preform arranged between two plates and a manufacturing die arranged to illustrate a step used to manufacture an elastomeric spring uni embodying principals and teachings of this invention disclosure;

FIG. 11 is a longitudinal sectional view of a spring unit shown at full compression using plates as shown in FIGS. 4 through 7 and embodying principals and teachings of this invention disclosure;

FIG. 12 is an enlarged sectional view of one form of cooperating interlocks used to maintain adjacent spring units in axially stacked and aligned relation relative to each other;

DETAILED DESCRIPTION OF THE INVENTION DISCLOSURE

Figure 1:
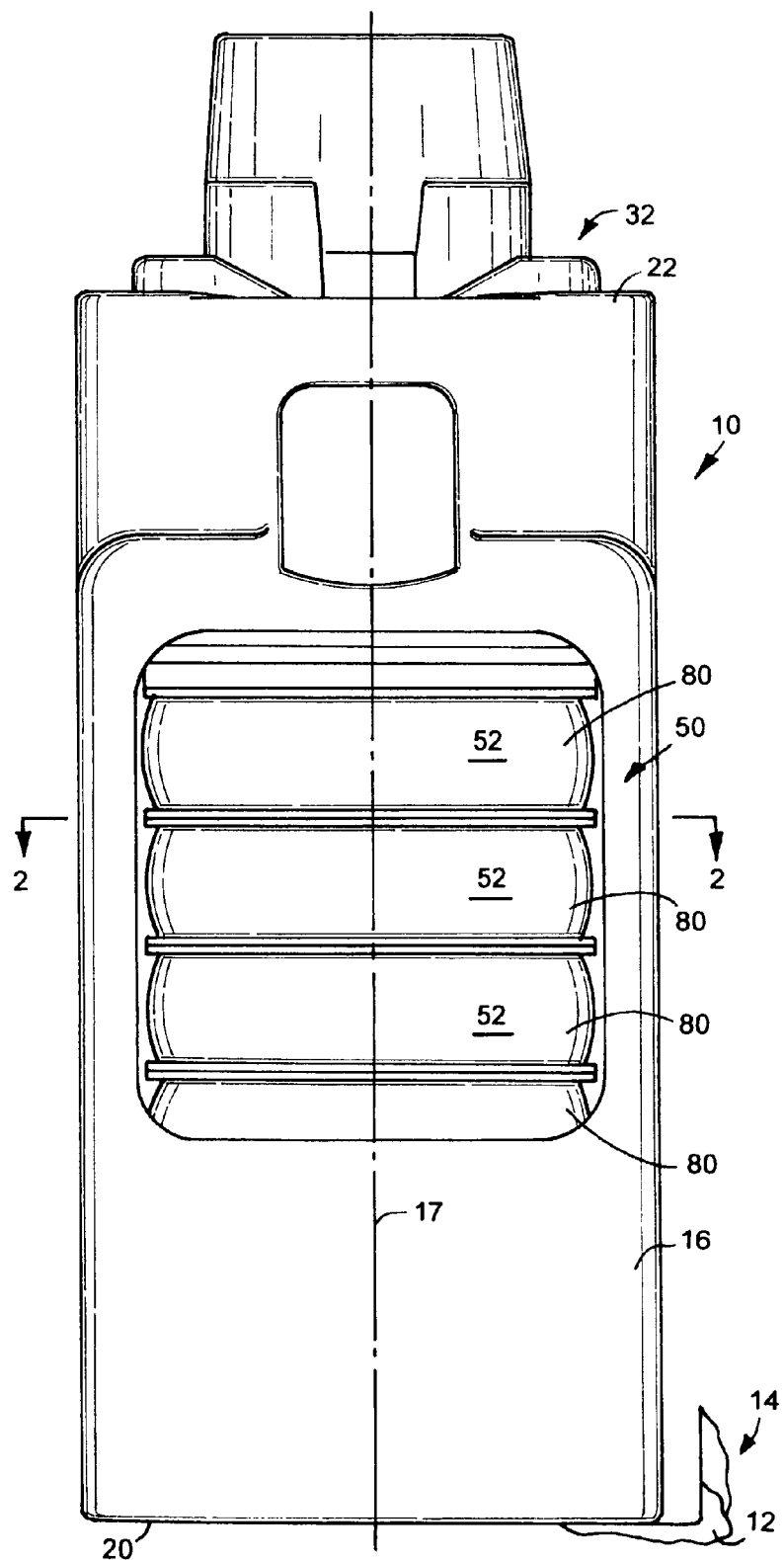
FIG. 1 is a side elevational view of one form of draft gear having an elastomeric spring embodying principals and teachings of this invention disclosure.

While this invention disclosure is susceptible of embodiment in multiple forms, there is shown in the drawings and will hereinafter be described preferred embodiments, with the understanding the present disclosure sets forth exemplifications of the disclosure which are not intended to limit the disclosure to the specific embodiments illustrated and described.

Figure 2:
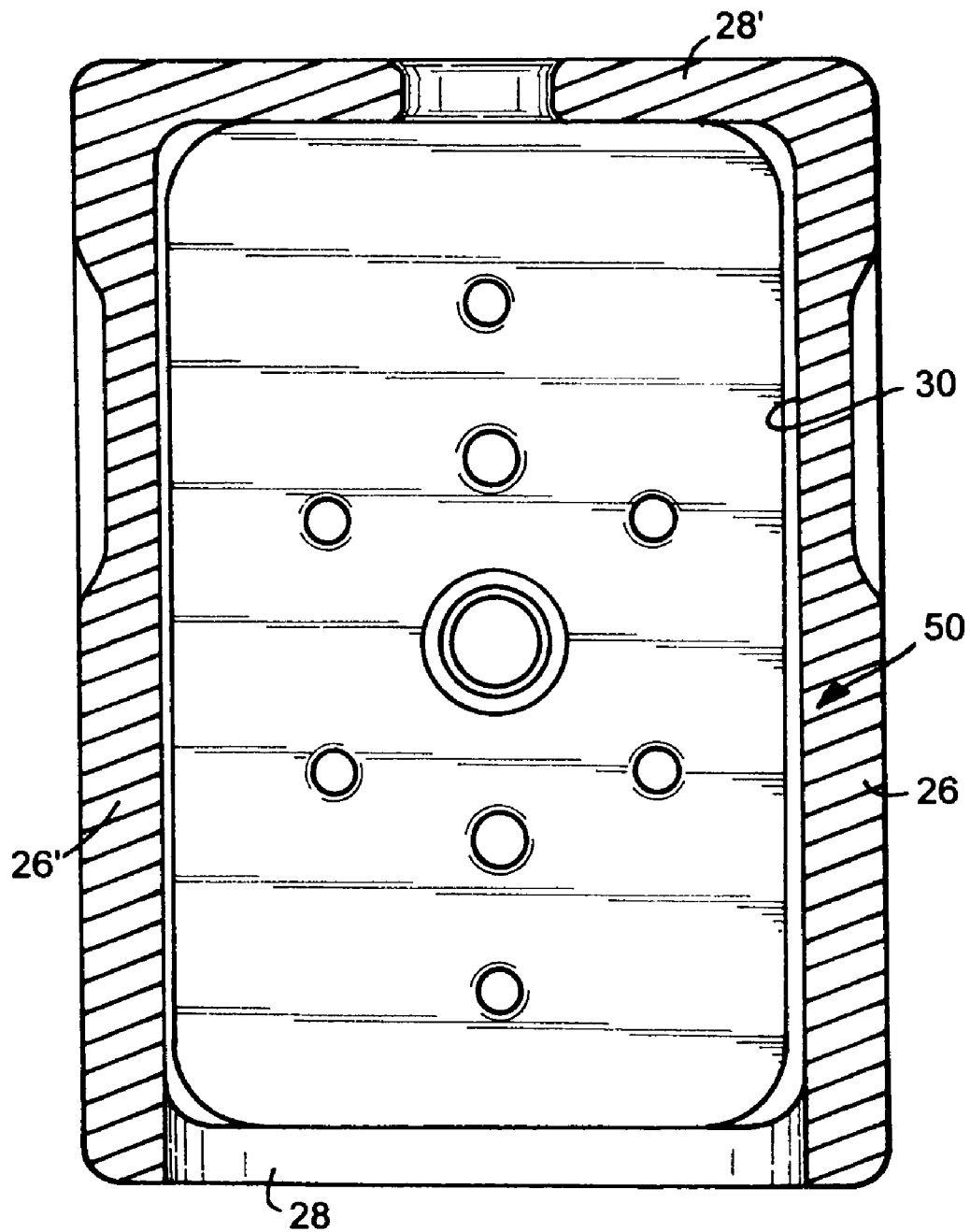
FIG. 2 is a sectional view taken along line 2-2 of FIG. 1.
Figure 3:
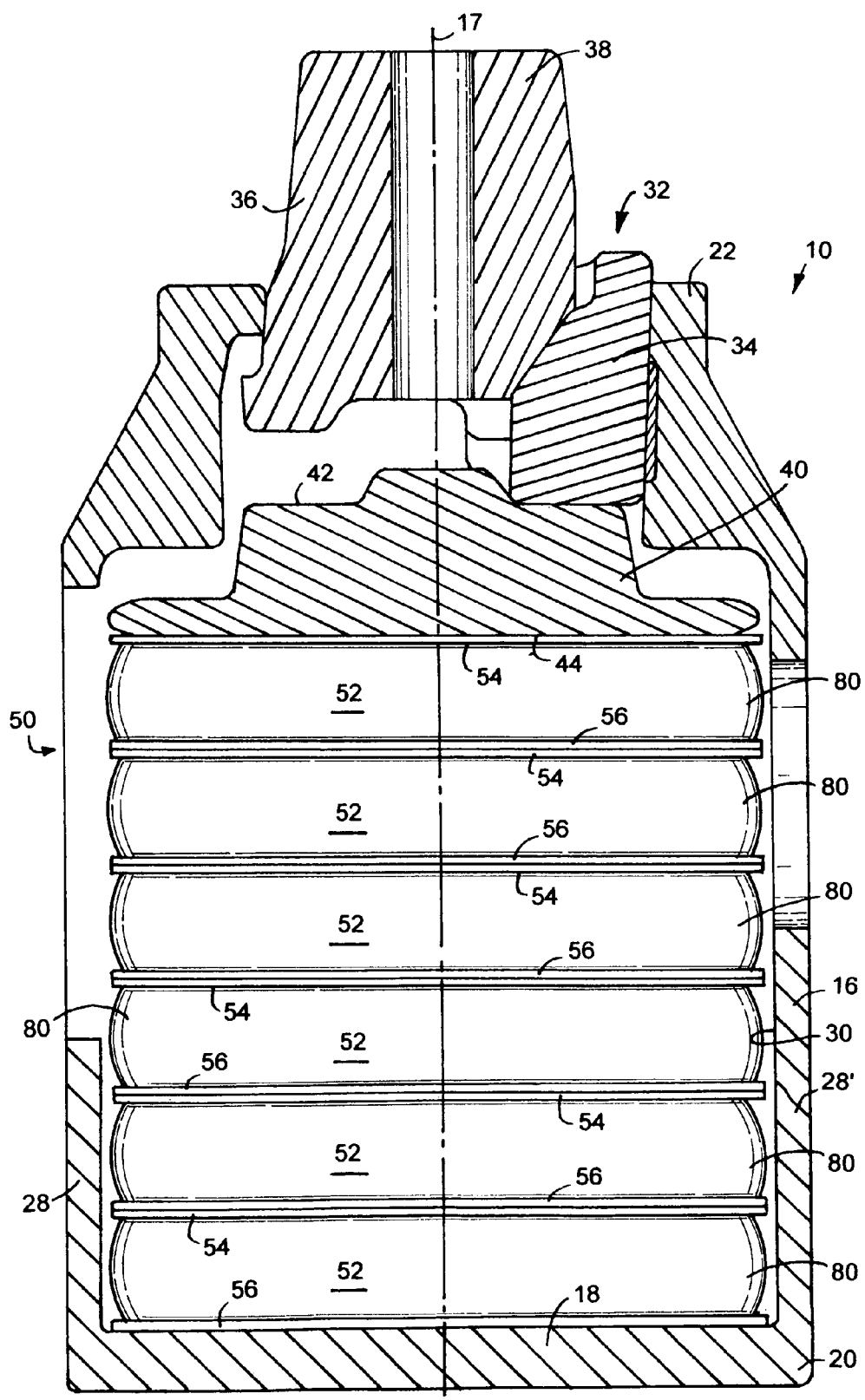
FIG. 3 is a longitudinal sectional view of the draft gear illustrated in FIG. 1.

Referring now to the drawings, wherein like reference numerals indicate like parts throughout the several views, there is shown in FIG. 1 a railroad car draft gear, generally indicated by reference numeral 10, adapted to be carried within a yoke 12 arranged in operable combination with a centersill (not shown) of a railcar 14. Draft gear 10 includes an axially elongated hollow and metallic housing 16 defining a longitudinal axis 17 for the draft gear 10. Housing 16 is closed by an end wall 18 (FIG. 3) at a first or closed end 20 and is open toward a second or open end 22. Two joined pairs of generally parallel walls 26, 26' and 28, 28' (FIG. 2), extend from the closed end 20 toward the open end 22 and define a spring chamber 30 within housing 16 (FIGS. 2 and 3). As shown in FIG. 2, the housing walls 26, 26' and 28, 28' provide spring chamber 30 with a generally rectangular or boxlike cross-sectional configuration for a major lengthwise portion thereof.

A conventional draft gear 10 is also provided with a friction clutch assembly 32 for absorbing draft forces or impacts axially directed against the draft gear 10. In the embodiment shown in FIG. 3, the friction clutch assembly 32 includes a plurality of friction members or shoes 34 arranged about axis 17 and in operable combination with the open end 22 of the draft gear housing 16. As known, the friction clutch assembly 32 further includes a wedge member or actuator 36 arranged for axial movement relative to the open end 22 of housing 16. An outer end 38 of the wedge member 36 preferably has a generally flat face that extends beyond the open end 22 of housing 16 and is adapted to bear on the usual follower (not shown) of a railway draft rigging such that draft or impact forces can be axially applied to the draft gear 10 during operation of the railcar 14. As known, wedge member 36 is arranged in operable combination with the friction members 34.

As shown in FIG. 3, draft gear 10 furthermore includes a spring seat or follower 40 arranged within the hollow spring chamber 30 of housing 16 and disposed generally normal or generally perpendicular to the longitudinal axis 17 of the draft gear 10. Spring seat 40 is adapted for reciprocatory longitudinal or axial movements within chamber 30 and has a first surface 42 in operable association with each friction member 34. Spring seat 40 also has a second or spring contacting surface 44.

An axially elongated elastomeric spring assembly 50 is generally centered and slidable within chamber 30 of the draft gear housing 16. In part, spring assembly 50 absorbs the very substantial impact forces imposed upon the railcars during their movement, and, more significantly, when the cars are being coupled into a train consist in the railyard. Spring assembly 50 forms a resilient column for storing dissipating and returning energy imparted or applied to the free end 38 of wedge member 36 during axial compression of the draft gear 10. One end of spring assembly 50 is arranged in contacting relation with the end wall 18 of housing 16. A second end of spring assembly 50 is pressed or urged against surface 44 of the spring seat 40 to oppose inward movements of the friction members 34 and wedge member 36. As known, spring assembly 50 is precompressed during assembly of the draft gear 10 and serves to maintain the components of the friction clutch assembly 32 in operable combination relative to each other and within the draft gear housing 16 both during operation of the draft gear 10 as well as during periods of non-operation of the draft gear 10. In the illustrated embodiment, spring assembly 50 develops about a 10,000 pound preload force for the draft gear 10 and is capable of resisting compressing force directed axially thereto in the range of between 300,000 lbs. and about 500,000 lbs., depending on the durometer hardness of the elastomer used in spring assembly 50.

In the form shown in FIG. 3, spring assembly 50 is comprised of a plurality of individual units or springs 52 arranged in axially stacked relationship relative to each other. Although six spring units 52 are shown for purposes of illustration, it will be appreciated a greater or lesser number of spring units can be provided without detracting or departing for the true spirit and novel concept of this invention disclosure. In a preferred embodiment, and to further reduce costs while adding to the durability, reliability and functional benefits of the draft gear 10, the individual spring units 52 comprising spring assembly 50 are substantially identical to each other. As such, a detailed description of only one spring unit 52 will suffice for an understanding of the construction of spring assembly 50.

Each cushioning unit or spring 52 includes a pair of metal plates 54 and 56 and an elastomeric pad or spring 80. In plan, each spring unit 52 has a non-circular and preferably generally rectangular shape so as to optimize the rectangular area of the spring chamber 30 (FIG. 3) wherein spring assembly 50 is slidably centered for axial endwise movements in response to loads or impacts being exerted axially against the draft gear 10 (FIG. 1).

Figure 4:
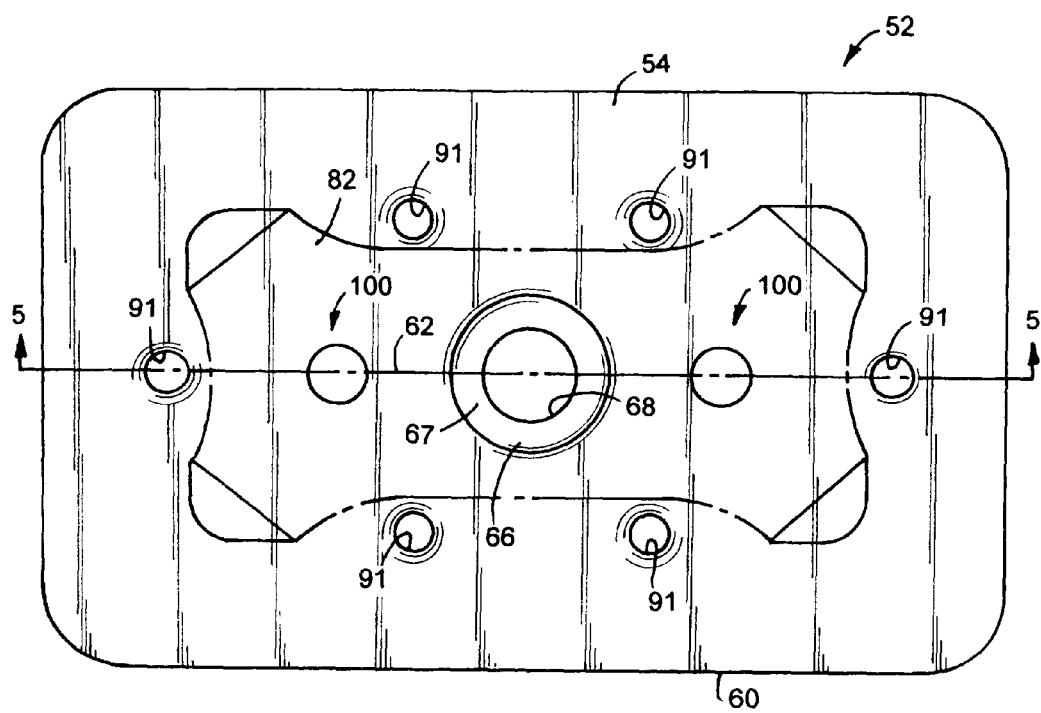
FIG. 4 is an enlarged plan view of a plate forming part of an elastomeric spring unit.
Figure 5:
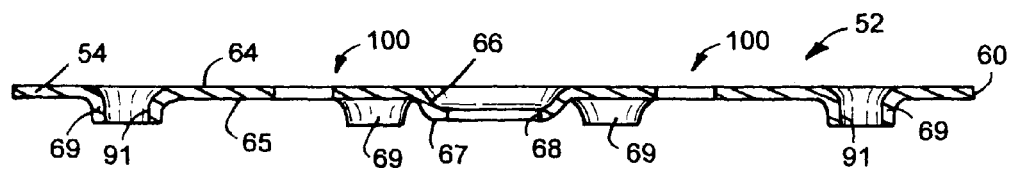
FIG. 5 is a sectional view taken along line 5-5 of FIG. 4.

As shown in FIG. 4, the metal plate 54 of spring unit 52 has a non-circular and generally rectangular outer profile or periphery 60 and defines a longitudinal axis 62. Preferably, plate 54 is formed from steel or a steel alloy. As shown in FIG. 5, the metal plate 54 of each unit 52 has first and second spaced, generally planar and generally parallel surfaces 64 and 65, respectively. In a preferred embodiment, plate 54 defines a generally centralized boss 66 extending away from surface 65 and terminating in an inwardly turned flange 67 defining a generally centralized bore or opening 68. As shown in FIG. 5, and for reasons discussed in further detail below, plate 54 is furthermore provided with a series of grippers 69 extending in a common direction away from plate surface 65 and arranged in a predetermined pattern relative to each other.

Figure 6:
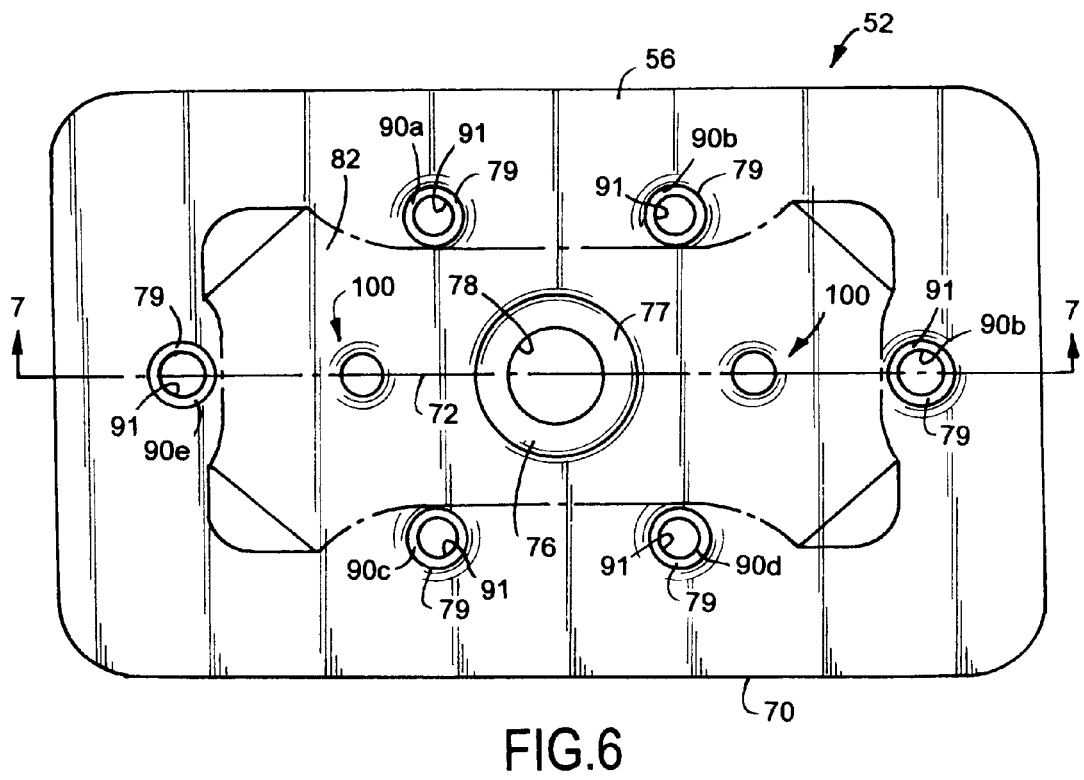
FIG. 6 is an enlarged plan view of another plate forming part of an elastomeric spring unit.
Figure 7:
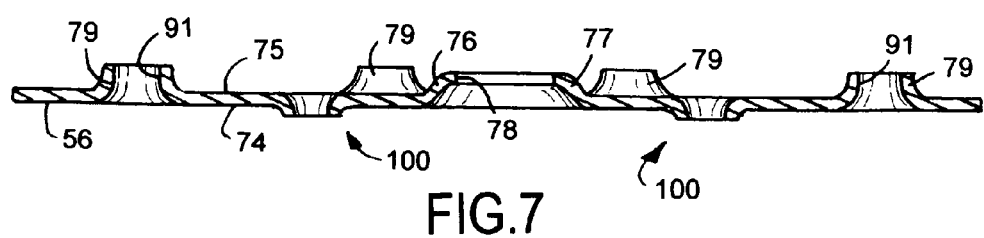
FIG. 7 is a sectional view taken along line 7-7 of FIG. 6.

As shown in FIG. 6, the metal plate 56 of spring unit 52 has a non-circular and generally rectangular outer profile or periphery 70 and defines a longitudinal axis 72. Preferably, plate 56 is formed from steel or a steel alloy. As shown in FIG. 7, the metal plate 56 of each unit 52 has third and fourth spaced, generally planar and generally parallel surfaces 74 and 75, respectively. In a preferred embodiment, and like plate 54, plate 56 also defines a generally centralized boss 76 extending away from surface 75 and terminating in an inwardly turned flange 77 defining a generally centralized bore or opening 78. As shown in FIG. 6, and for reasons discussed in further detail below, plate 56 also is furthermore provided with a series of grippers 79 extending in a common direction away from plate surface 75 and arranged in a predetermined pattern relative to each other.

Figure 8:
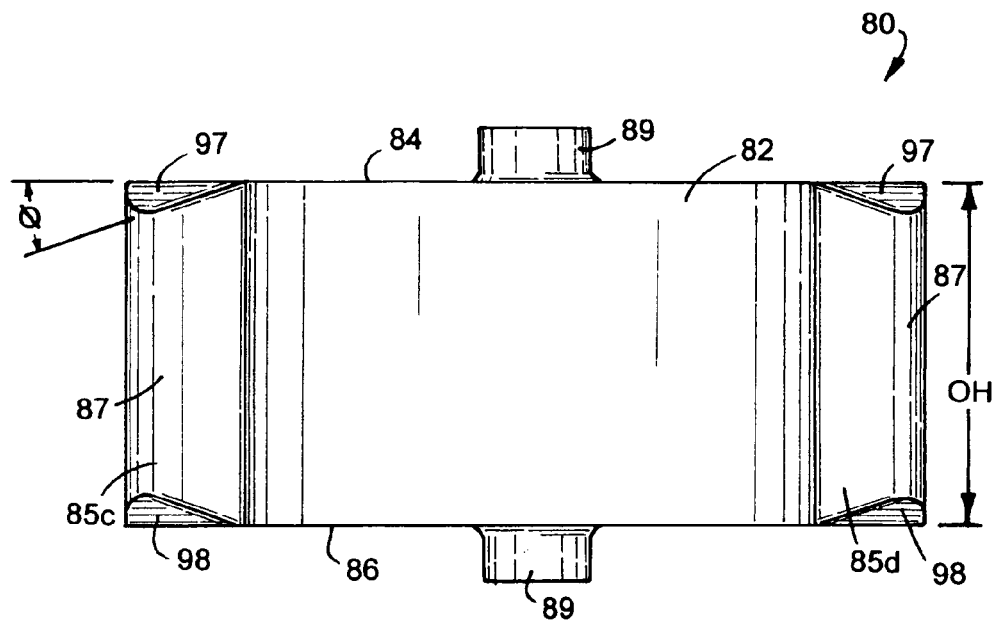
FIG. 8 is a side elevational view of one form of elastomeric preform used to form an elastomeric spring according to the present invention disclosure.

Turning now to FIG. 8, spring 80 is formed from a non-circular preformed block 82 of copolyester elastomer. The preform 82 used to form spring 80 is very durable, inert to reaction with grime, salt or corrosive fluids, is not subject to tear propagation, and has tensile characteristics such that the ratio of plastic strain to elastic strain is greater than 1.5 to 1. When bonded to the metal plates 54, 56 (FIG. 11) as set forth herein, the elastomer will form a more lasting and durable bond far exceeding the needs of even the demanding railcar industry. While many such elastomers have such characteristics and are suitable to form preform 82, one copolyester elastomer which offers beneficial results is sold by E. I. DuPont de Nemoirs under the trademark "Hytrel®". The DuPont Company provides this material under different composition numbers to reflect minor differences in properties. Suffice it to say for the railcar draft gear application shown in FIG. 1, the copolyester elastomer preform 82 will have a Shore D durometer hardness ranging between about 38 and about 57. As will be appreciated, the Shore D durometer hardness of the copolyester elastomer preform 82 will be a function of the expected performance characteristics for the draft gear.

Figure 9:
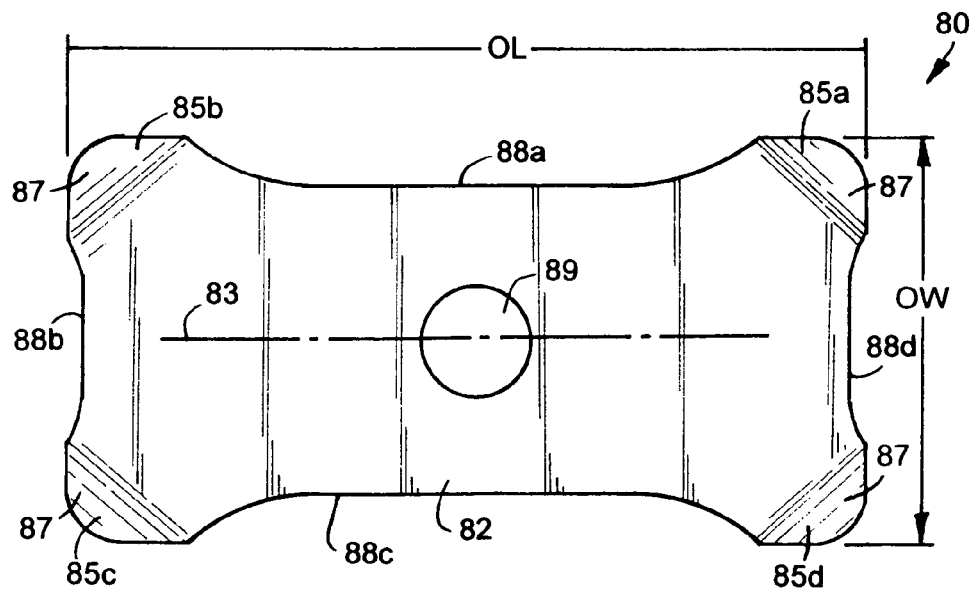
FIG. 9 is a top plan view of the elastomeric preform illustrated in FIG. 8.

Turning to FIG. 8, the elastomeric preform 82 has a given thickness or original height OH defined between two generally parallel flat or planar surfaces 84 and 86. In the embodiment illustrated by way of example in FIG. 9, the elastomeric preform 82 has a series of spaced corners 85a, 85b, 85c and 85d. As shown in FIG. 9, the elastomeric preform 82 preferably includes a lobe or rounded protrusion or projection 87 formed at each corner 85a, 85b, 85c and 85d and extending substantially the original height OH of the preform 82. Preferably, the lobes or projections 87 formed on the preform 82 are substantially identical to each other. The non-circular preform 82 further includes a plurality of generally vertical upstanding sides 88a, 88b, 88c and 88d extending between two adjacent lobes 87 at the corners of the preform 82. In the embodiment shown in FIG. 9, the elastomeric preform 82 has a "dog bone" configuration in plan.

In the embodiment shown in FIG. 9, a lengthwise portion of each side 88a and 88c of the elastomeric preform 82 is laterally recessed toward the longitudinal center of the preform 82. Preferably, the recessed portions of the sides 88a and 88c extend generally parallel relative to each other and generally parallel to a longitudinal axis 83 of the preform 82. In the illustrated embodiment, the recessed portions of the sides 88a and 88c are equidistantly spaced to opposed lateral sides of the longitudinal axis 83 of the preform 82. In a preferred embodiment, the recessed portion of each side 88a, 88c on the elastomeric preform 82 longitudinally extends for a distance approximating about 40% to about 60% of the overall length OL of the preform 82.

In the embodiment shown in FIG. 9, a lateral portion of each side 88b and 88d of the preform 82 is longitudinally recessed toward the lateral center of the preform 82. Preferably, the recessed portions of the sides 88b and 88d extend generally parallel relative to each other and generally normal to the recessed portions on the sides 88a and 88c of the preform 82. In the illustrated embodiment, the recessed portions of the sides 88b and 88d are equidistantly spaced to opposed longitudinal sides of the projections 89 on the preform 82. In a preferred embodiment, the recessed portion on each side 88b, 88d of the elastomeric preform 82 laterally extends for a distance approximating about 50% to about 85% of the overall width OW of the preform 82.

As will be appreciated from an understanding of the present invention disclosure, the degree or amount of the longitudinal and lateral recesses formed on the preform 82 will be proportional to the overall length OL and overall width OW, respectively, of the preform 82. In the embodiment illustrated in FIG. 9, the recesses extending along the longitudinal sides 88a and 88c of the preform 82 cumulatively amount to about 20% to about 30% of the overall width OW of the preform 82. In the embodiment illustrated in FIG. 9, the recesses extending along the lateral sides 88b and 88d of the preform 82 cumulatively amount to about 5% to about 15% of the overall length OL of the preform 82.

Because the preform 82 has a generally rectangular configuration, in plan, and when compressed, the greatest material flow occurs at the mid-span of the elongated straight edges closet to the center of the preform 82. Accordingly, and in the illustrated embodiment, the sides 88a and 88c of the preform 82 will be recessed toward the center of the preform 82 a greater amount than will the recessed sides 88b and 88d. Of course, if all the sides of the non-circular preform 82 are equally disposed relative to the center of the preform, i.e., a preform having a square or equilateral triangular in plan, all the sides of the non-circular preform would be equally recessed relative to the center of the preform.

Returning to FIG. 8, and in a preferred embodiment, preform 82 furthermore defines a generally centralized projection or nipple 89 extending from each flat surface 82, 84. As shown in FIG. 10, each nipple or projection 89 is configured such that it will extend endwise into and through the openings 68 and 78 in plates 54 and 56, respectively, whereby advantageously locating the preform 82 relative to the plates 54 and 56. Additionally, the length of each centralized projection or nipple 89 is such as to extend beyond the boss 66, 76 and inwardly turned flange 67, 77 on each plate 54, 56, respectively.

The grippers 69 on plate 54 and the grippers 79 on plate 56 serve several important functions. Initially, the grippers 69 on plate 54 and the grippers 79 on plate 56 serve to position and locate the non-circular preform 82 relative to the plates 54 and 56 whereby insuring the plates 54, 56 and preform 82 are properly oriented relative to each other. To accomplish these ends, the grippers 69, 79 preferably extend away from the respective surfaces 65, 75 of plates 54 and 56 for a distance generally equal or slightly greater than the distance the flanges 67, 77 on plates 54 and 56, respectively, extend away from the respective surfaces 65, 75 of plates 54 and 56. Second, the grippers 69 on plate 54 and the grippers 79 on plate 56 serve to resist or limit the flow of elastomer of the preform 82 relative to the outer profile 60, 70 of the plates 54, 56, respectively, during formation of the spring 80. Moreover, the grippers 69 on plate 54 and the grippers 79 on plate 56 serve to resist or limit expansion of the spring 80 as a compressive force is applied to each spring unit 52 during operation of the draft gear whereby enhancing overall performance and compressive strength of spring assembly 50.

The grippers 69 on plate 54 and the grippers 79 on plate 56 can be configured and designed in different ways without detracting or departing from the true spirit and scope of this invention disclosure. To further reduce manufacturing costs, the grippers 69 are preferably formed integral with the plate with which they are associated. Of course, the grippers 69 and 79 could be separately formed from their respective plates 54 and 56 without seriously detracting or departing from the true spirit and scope of this invention disclosure. In the illustrated embodiment, and to reduce manufacturing costs, the grippers 69 on plate 54 and the grippers 79 on plate 56 are substantially similar relative to each other. Accordingly, only the grippers 79 arranged in plate 56 will be discussed in detail.

In the embodiment illustrated in FIG. 6, the grippers are arranged in a predetermined pattern relative to each other and include a plurality of extruded protrusions 90a through 90f extending away from that planar surface of the respective plate and are arranged in confronting relation relative to the flat surface 84, 86 (FIG. 8) of the preform 82. In the embodiment illustrated in FIG. 6, the protrusions are six in number and each defines an aperture or opening 91. A greater or lesser number of protrusions can be provided without detracting or departing from the true spirit and scope of this invention disclosure. Suffice it to say, the protrusions 90a through 90f define abutments or steps which are angularly aligned with respect to the surface of the plate from which the grippers 90 extend.

Preferably, two protrusions 90a and 90b are longitudinally aligned relative to each other and are laterally spaced a predetermined distance to one lateral side of the longitudinal axis of the plate from which they are formed or associated. In the embodiment illustrated in FIG. 6, two additional protrusions 90c and 90d are formed on the plate in longitudinally aligned relative to each other and are laterally spaced a predetermined distance from the longitudinal axis of the plate in a direction opposite from protrusions 90a and 90b. As shown in FIG. 6, the lateral spacings between the protrusions 90a and 90c along with 90b and 90d is generally equal to the lateral spacing between the recessed portions 88a and 88c of the preform 82 (FIG. 9).

Preferably, protrusions 90e and 90f are longitudinally aligned relative to each other and relative to the longitudinal axis of the plate from which they are formed or associated. Moreover, protrusions 90e and 90f are longitudinally spaced from each other by a predetermined distance. As shown in FIG. 6, the longitudinal spacing between protrusions 90e and 90f is generally equal to the longitudinal spacing between the recessed portions 88b and 88d of the preform 82 (FIG. 9). As such, the grippers on each plate 54, 56 preferably positions the non-circular preformed block 82 of copolyester polymer relative to the respective plates 54, 56.

FIG. 10 illustrates the plates 54 and 56 being arranged in combination with the preform 82 and such that the central openings 68 and 78 of the plates 54 and 56, respectively, have been inserted over the projections 89 extending from the opposed faces 84 and 86 of the preform 82. Such an arrangement insures the metal plates 54 and 56 are properly positioned relative to the preform 82. Moreover, and as mentioned above, the grippers 69 on plate 54 and the grippers 79 on plate 56 are configured to furthermore position the preform 82 relative to the plates 54 and 56.

As shown in FIG. 10, and after the plates 54 and 56 are arranged in combination with the preform 82, the assembly is placed in a suitable hydraulic, mechanical or other form of press P having a die including a first or lower die shoe or plate 92 having a generally centralized projection 93. The press die also has a vertically displacable second or upper die shoe or plate 94 having a generally centralized projection 95. The assembly including plates 54, 56 and preform 82 are arranged in the die such that the nipples or projections 89 from the preform 82 are aligned with the generally centralized projections 93 and 95 of the dies. The alignment of the nipples 89 on the preform 82 relative to the projections 93 and 95 on the die set can be effected either visually or, preferably, through suitable automated means (not shown).

To form the elastomeric compression spring unit 52 (FIG. 11), a force F is applied to the die so as to compress the preform 82 between the plates 54, 56. Preferably, the elastomeric preform 82 is compressed by at least 30% of it's original height OH (FIG. 8) and, preferably, by more than 50% of it's original height OH. The compressive force F is applied to the preform 82 for several seconds whereby transmuting the preform 82 into an elastomeric spring 80. When the compressive force F is removed from the die, spring 80 will return to an operative height somewhat less than the original height OH (FIG. 8) of the preform 82.

The compression of the preform 82 between plates 54 and 56 accomplishes at least two important functions. As mentioned, the compression of the preform 82 causes the elastomer to take a permanent compression set and orients the molecular structure of the elastomer. As explained in U.S. Pat. No. 4,198,037 to D. G. Anderson, the applicable portions of which are incorporated herein by reference, the preform 82 will take this "set" and thereafter will function and act as an effective compression spring such that upon subsequent applications of force, the elastomer between the plates 54 and 56 will consistently return to a predetermined height.

Compression of the preform 82 between plates 54 and 56 furthermore serves to effectively secure the plates 54 and 56 to the spring 80 whereby forming the spring unit 52. That is, during the compression step, the free end of each nipple 89 is preferably cold-formed or cold-headed relative to the generally centralized boss 66 and 76 on each plate 54 and 56, respectively, so as to form a rivet head 96 (FIG. 11) from the elastomer forming the free end of the nipple 89. The rivet head 96 extends over the inwardly turned flanges 67 and 77 to insure a permanent, fixed mechanical bond between the plates 54, 56 and the elastomeric spring 80.

As mentioned above, and as illustrated in FIG. 11, the grippers 69, 79 on the respective plates 54, 56 serve to limit or resist the flow of elastomer relative to the outer profiles 60, 70 on the respective plates 54, and 56 during compression of the preform 82. As will be appreciated from the above description, the compressive force F causes the copolyester polymer elastomer to flow or pass about and around the grippers 69, 79 whereby permitting the prearranged grippers 69, 79 to limit the radial expansion of the elastomer beyond the profiles 60 and 70 of the respective plates 54, 56. Additionally, and during the compression step, elastomer tends to flow into the opening 91 defined by each gripper 69, 79 whereby furthermore serving to limit expansion of the elastomer. The resultant elastomeric spring 80 has a non-circular, generally rectangular configuration, in plan, with the sides of the spring 80 (as shown in FIGS. 1, 3 and 11) having an outwardly bulging, generally curvilinear or convex configuration.

Returning to FIGS. 8 and 9, providing the lobe 87 at each corner 85a, 85b, 85c and 85d of the preform 82 furthermore facilitates formation of an elastomeric spring offering both beneficial and surprising enhancements during operation of spring 80 (FIG. 11). As shown in FIGS. 4 and 6, and because of the diagonal and distant relationship of the corners of each non-circular plate 54, 56 relative to the sides thereof, formation of a lobe 87 at each corner 85a through 85d of the preform 82 advantageously permits elastomeric material to flow outwardly toward the corners of the non-circular plates 54 and 56 during the compression phase of spring formation whereby significantly increasing surface area of the elastomeric spring 80 relative to the plates 54, 56 without having elastomer spread beyond the outer profile 60, 70 of the respective plates 54, 56.

To optimize the flow of elastomeric material to the perimeter of the non-circular plates 54 and 56, and as discussed above, adjustments to the straight edges or sides 88a through 88d have been made to the preform 82. The longitudinal sides 88a and 88c of the preform 82 are stepped in the most with the lateral sides 88b and 88d being stepped in a lesser amount. Because the corners 85a through 85d of the preform 82 will not move radially outward as much as the sides 88a through 88d during the spring formation process, they are configured such that upon maximum compression of the spring 80, the corners 85a through 85d will flow to the corners of the non-circular plates 54 and 56.

Because the flow of material away from the center of the preform 82 during the spring formation process is greatest along the sides 88a and 88d of the preform 82, the formed height of the spring 80 along the longitudinal sides 88a and 88c will be less than the formed height of the spring 80 along the lateral edges 88b and 88d. As mentioned, the flow of elastomer material at the corners 85a through 85d will be the least and, thus, the height of the formed spring 80 would tend to be the greatest at the corners 85a through 85d.

To address this concern, and to substantially equalize the height about the perimeter of the formed spring 80, all the lobes 87 are preferably configured to compensate for the tendency of the corners 85a through 85d of the preform 82 to have lesser material flow during the spring formation process. In one form, the opposed surfaces 97 and 98 of each lobe 87 are each preferably slanted or angled away from the respective flat surface 84, 86 of the elastomeric preform 82 whereby reducing the vertical height of each lobe 87. Preferably, the surfaces 97, 98 are each slanted or angled at an angle $\theta$ ranging between about 25° and about 40° relative to the respective flat surface 84, 86 of the preform 82. In a most preferred form, the surfaces 97, 98 are each slanted or angled at about 30° relative to the respective flat surface 84, 86 of the preform 82. As such, and when the copolyester elastomer of the preform 82 is compressed, the surfaces 97 and 98 of each lobe 87 are maintained generally coplanar or flat with the remainder of the surfaces 84 and 86 on the preform 82.

Preferably, in the embodiment shown in FIGS. 4, 6, 11 and 12, the plates 54 and 56 of each spring unit 52 further include cooperating interlocks 100 for facilitating and maintaining the spring units 52 in stacked relation relative to each other within the spring chamber 30 of the housing 16 (FIG. 1). As shown in FIG. 11, the plate 54 of each spring unit 52 has two longitudinally spaced apertures or openings 102 and 102' while plate 56 of each spring unit 52 has two longitudinally spaced projections 104 and 104' arranged in depending relation from surface 74 of plate 56. The longitudinal spacing between the openings 102, 102' is generally equal to the longitudinal spacing between the projections 104, 104', respectively. Consequently, when stacked upon each other in the spring chamber 30 of the draft gear housing 16 (FIG. 3), the projections 104, 104' depending from the plate 56 of one spring unit 52 will extend into the apertures 102, 102' in the plate 54 of the adjacent spring unit 52. As such, and as shown in FIG. 12, the cooperating interlocks 100 on the spring units 52 not only provides a flat nesting of the adjacent plates but furthermore advantageously adds rigidity and stability to the stacked spring units 52 comprising spring assembly 50 within spring chamber 30 of the draft gear housing 16 (FIG. 3).

Figure 13:
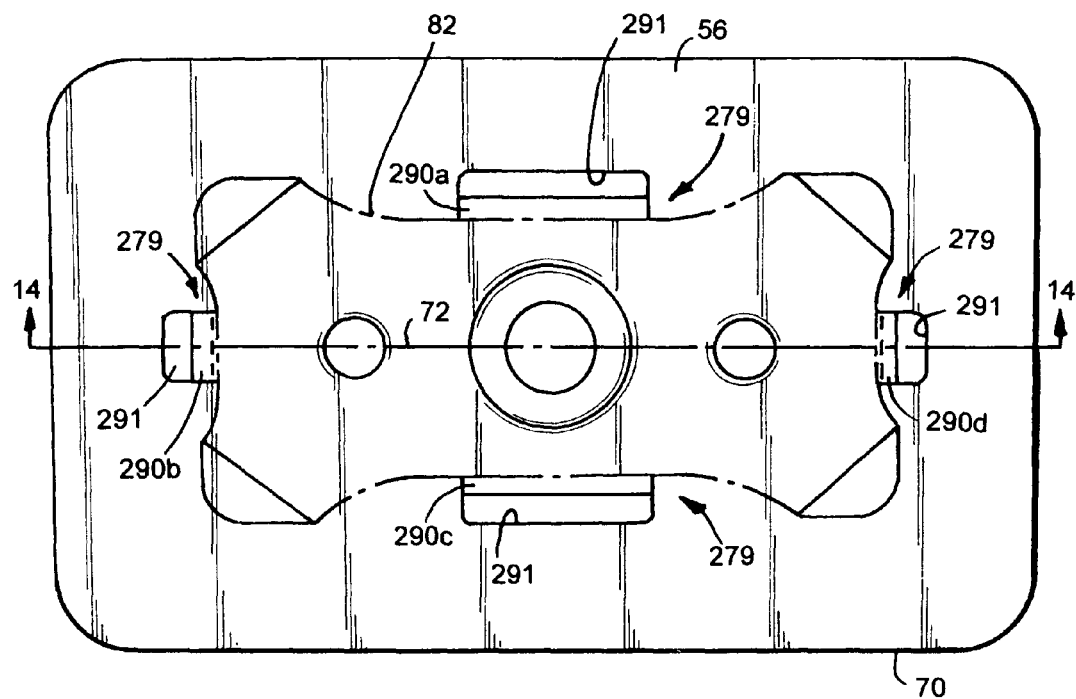
FIG. 13 is an enlarged plan view similar to FIG. 4 showing an alternative form of plate forming part of an elastomeric spring unit.
Figure 14:
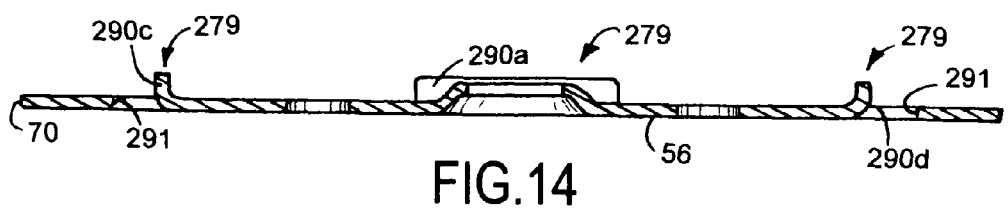
FIG. 14 is a sectional view taken along line 14-14 of FIG. 13.

As mentioned, the grippers on the metal plates of each spring unit forming the spring assembly can be configured and designed in different ways without detracting or departing from the true spirit and scope of this invention disclosure. FIGS. 13 and 14 illustrate an alternative form for the grippers on the plates of each spring unit. Like grippers 69 and 79 discussed above, and to reduce manufacturing costs, the alternative form for grippers on the plates 54 and 56 are substantially similar relative to each other. Accordingly, only the alternative form of grippers on plate 56 will be discussed in detail. The form of alternative grippers illustrated in FIGS. 13 and 14 are designated generally by reference numeral 279. The elements of the metal plate 56 with which the grippers 279 are associated and that are functionally analogous to plate 56 described above are designated by similar reference numerals to those listed above.

In the embodiment shown in FIGS. 13 and 14, the grippers 279 are arranged in a predetermined pattern relative to each other include a plurality of tabs 290a through 290d extending from that planar surface of the respective plate adapted to be arranged in confronting relation relative to the respective flat surface of the preform. As shown in FIGS. 13 and 14, the tabs are only four in number and are preferably formed integral with the plate. Of course, the tabs 290a through 290d could be separately formed from the respective plate 56 without seriously detracting or departing from the spirit and scope of this invention disclosure. In the illustrated embodiment, the tabs 290a through 290d are punched or otherwise formed from the plate 56. As such, and when the tabs 290 are punched or otherwise formed, an adjacent opening or aperture 291 is provided in the plate 56. Suffice it to say, the tabs 290 define abutments or steps which are angularly aligned with respect to the surface of the plate from which the grippers 279 extend. Each gripper 279 preferably extends away from the spring contacting surface of the respective plate for a distance generally equal or slightly greater than the distance the flange on the respective plates extends away from the spring contacting surface of the plate.

In the embodiment shown in FIG. 13, the tabs 290a and 290c are longitudinally elongated and are laterally spaced a predetermined and equal distance to opposed lateral sides of the longitudinal axis 72 of the plate from which they are formed or associated. As shown in FIG. 13, the lateral spacing between the tabs 290a and 290c is generally equal to the lateral spacing between the laterally spaced and recessed portions 88a and 88c of the preform 82 (FIG. 9).

Preferably, two other tabs 290b and 290d are longitudinally aligned relative to each other and relative to the longitudinal axis 72 of the plate from which they are formed or associated.

Moreover, the tabs or protrusions 290b and 290d are longitudinally spaced apart from each other by a predetermined distance. The longitudinal spacing between the protrusions 290b and 290d is generally equal to the longitudinal spacing between the recessed and longitudinally spaced and recessed portions 88b and 88d of the preform 82 (FIG. 9). As such, the grippers 279 on each plate of a spring unit preferably position the non-circular preformed elastomer block 82 relative to the respective plates. Moreover, the grippers on the plates serve to restrict or limit expansion of the spring 80 as a compressive force is applied to each spring unit during operation of the draft gear whereby enhancing overall performance and compressive strength of spring assembly.

Figure 15:
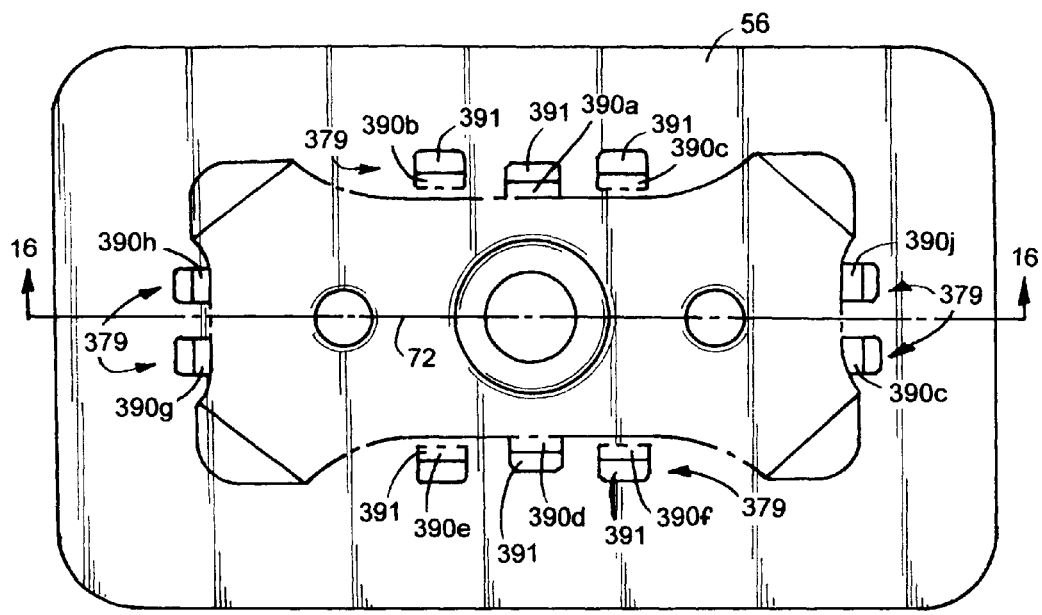
FIG. 15 is an enlarged plan view similar to FIG. 4 showing another plate forming part of an elastomeric spring unit.
Figure 16:
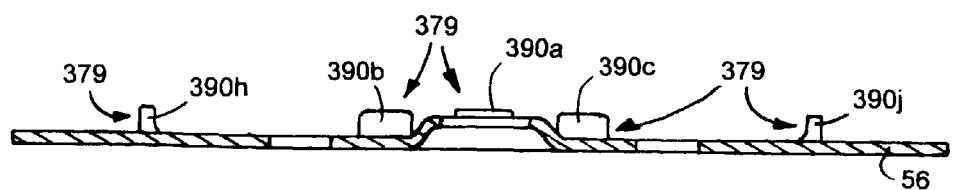
FIG. 16 is a sectional view taken along line 16-16 of FIG. 15.

FIGS. 15 and 16 illustrate another alternative form for the grippers on the plates of each spring unit. Like grippers 69 and 79 discussed above, and to reduce manufacturing costs, the alternative form for grippers on the plates 54 and 56 are substantially similar relative to each other. Accordingly, only the alternative form of grippers on plate 56 will be discussed in detail. The alternative form of grippers illustrated in FIGS. 15 and 16 are designated generally by reference numeral 379. The elements of the metal plate 56 with which the grippers 379 are associated and that are functionally analogous to plate 56 described above are designated by similar reference numerals to those listed above.

In the embodiment illustrated in FIGS. 15 and 16, the grippers 379 are arranged in a predetermined pattern relative to each other and include a plurality of tabs 390a through 390j projecting away from that planar surface of the respective plate and adapted to be arranged in confronting relation relative to the flat surface of the preform. In the embodiment illustrated in FIGS. 15 and 16 the tabs are eight in number and are preferably formed integral with the plate from which they extend. Of course, the tabs 390a through 390j could be separately formed from the respective plate 56 without seriously detracting or departing from the true spirit and scope of this invention disclosure. In the illustrated embodiment, the tabs 390a through 390j are punched or otherwise formed from the plate 56. As such, and when the tabs 390 are punched or otherwise formed, an adjacent opening or aperture 391 is provided in the plate 56. Suffice it to say, the tabs 390 define abutments or steps which are angularly aligned with respect to the surface of the plate from which the grippers 379 extend. Each gripper 379 preferably extends away from the spring contacting surface of the respective plate for a distance generally equal or slightly greater than the distance the flange on the respective plates extends away from the spring contacting surface of the plate.

In the embodiment shown in FIG. 15, the tabs 390a, 390b and 390c are longitudinally spaced and are disposed a predetermined lateral distance to one lateral side of the longitudinal axis 72 of the plate from which they are formed or associated. In the embodiment illustrated in FIG. 16, the tabs 390d, 390e and 390f are also longitudinally spaced and are disposed a predetermined lateral distance to the opposed lateral side of the longitudinal axis 72 of the plate from which they are formed or associated. As shown in FIG. 16, the lateral spacing between the tabs 390a and 390d is generally equal to the lateral spacing between the laterally spaced and recessed portions 88a and 88c (FIG. 9) of the preform. In the illustrated embodiment, the lateral spacing between the tabs 390b and 390e is somewhat greater than the lateral spacing between the laterally spaced and recessed portions 88a and 88c (FIG. 9) of the preform. Similarly, and in the illustrated embodiment, the lateral spacing between the tabs 390c and 390f is somewhat greater than the lateral spacing between the laterally spaced and recessed portions 88a and 88c (FIG. 9) of the preform.

Preferably, four other tabs 390g, 390h along with 390i and 390j are arranged in longitudinally spaced relation relative to each other. Preferably, the tabs 390g and 390h are laterally aligned relative to each other. Similarly, the tabs 390i and 390j are laterally aligned relative to each other. Moreover, the protrusions or tabs 390g and 390h are longitudinally spaced from tabs 390i and 390j by a predetermined distance. As shown in FIG. 15, the longitudinal spacing between the tabs 390g, 390h and tabs 390i and 390j is generally equal to the longitudinal spacing between the recessed and longitudinally spaced and recessed portions 88b and 88d of the preform (FIG. 9). As such, the grippers 379 on each plate of the spring unit preferably position the non-circular preformed elastomer block relative to the respective plates of the spring unit. Moreover, the grippers 379 of the plates of the spring unit serve to restrict or limit expansion of the spring as a compressive force is applied to each spring unit during operation of the draft gear whereby enhancing overall performance and compressive strength of spring assembly.

Figure 17:
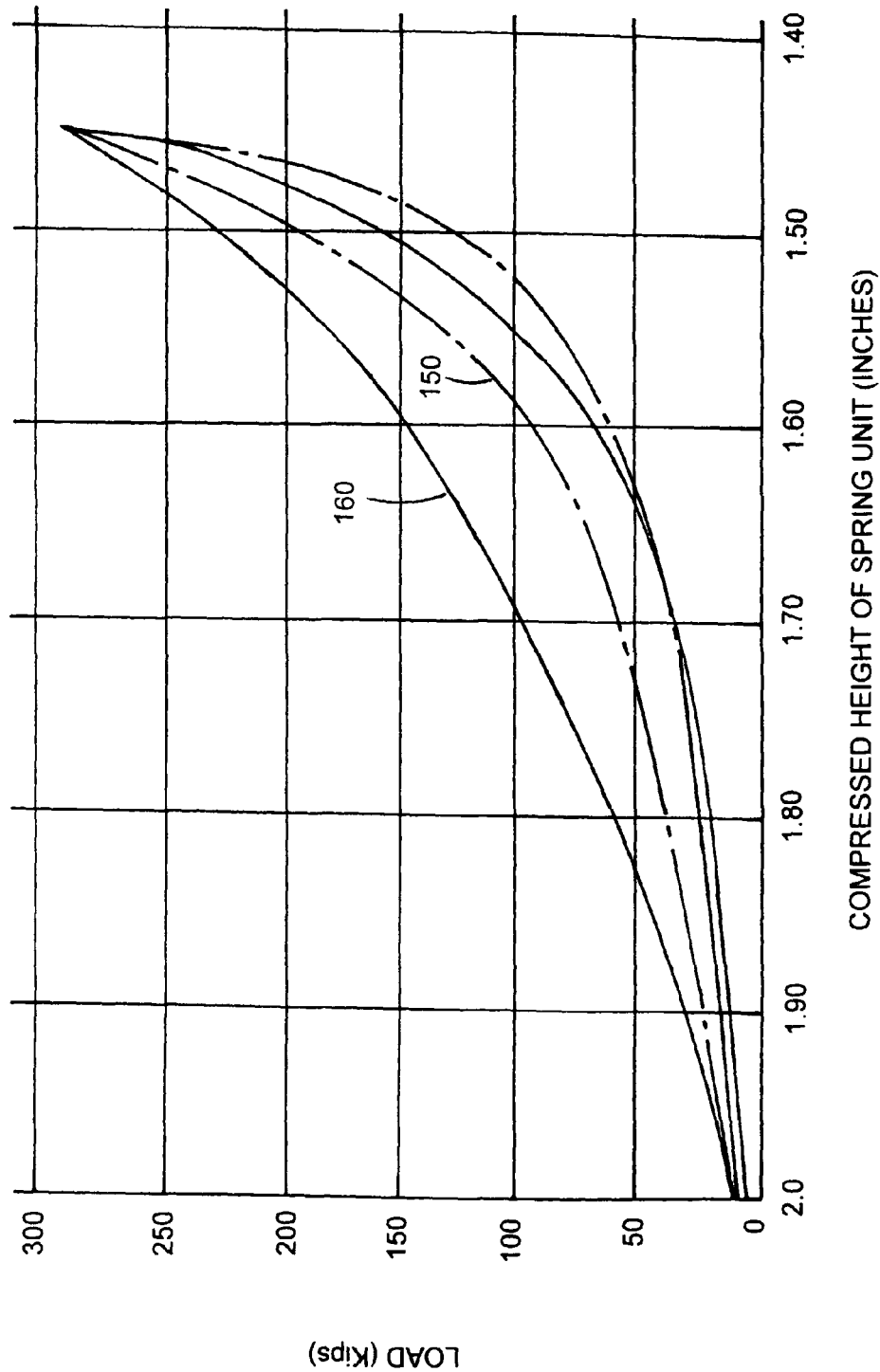
FIG. 17 is a graph schematically illustrating superior performance characteristics of a spring assembly embodying principals and teachings of this invention disclosure as compared to performance characteristics of a comparable conventional spring assembly.

Moreover, an elastomeric spring unit 52 embodying principals and teachings of this invention disclosure significantly increases the cushioning capacity of the draft gear 10. The graph schematically illustrated in FIG. 17 compares a typical closure cycle of one individual spring unit incorporating the teachings and principals of this invention disclosure against a conventional spring unit which uses rubber as a cushioning agent. Line 150 in the graph shown in FIG. 17 schematically represents performance results of the conventional spring unit. Line 160 in the graph shown in FIG. 17 schematically represents performance results of a spring unit embodying principals and teachings of this invention disclosure. The superior performance results illustrated by line 160 is apparent.

Additionally, there is provided a method of manufacturing a railcar draft gear elastomeric spring unit, comprising the steps of: providing a first non-circular plate 54 having first and second spaced and generally parallel planar surfaces 64 and 65, respectively; with the non-circular first plate 54 defining a longitudinal axis and a plurality of grippers 69 arranged in a predetermined pattern relative to each other. At least two grippers 69 are spaced equidistantly a predetermined lateral distance to one lateral side of the longitudinal axis of the first plate. Another step in the process involves: providing a second non-circular plate 56 having third and fourth spaced and generally parallel planar surfaces 74 and 75, respectively; with the non-circular first plate 56 defining a longitudinal axis and a plurality of grippers 79 arranged in a predetermined pattern relative to each other. At least two grippers 79 are spaced equidistantly a predetermined lateral distance and to one lateral side of the longitudinal axis of the second plate. Another step involves: arranging a non-circular preformed block of copolyester elastomer 82 of a given thickness between the respective second and fourth generally planar surfaces 65 and 75 of the first and second plates 54 and 56, respectively, such that the grippers 69, 79 on the plates position the non-circular preformed block of copolyester elastomer 82 relative to the plates 54, 56; and with the non-circular preformed block of copolyester elastomer 82 having a series of spaced corners 85a, 85b, 85c and 85d. The preformed block of copolyester elastomer 82 further has sides 88 extending between the corners 85a, 85b, 85c and 85d. Moreover, the preformed block of copolyester elastomer 82 further includes a lobe or projection 87 formed at each corner. Another step in the process involves: compressing the preformed block of elastomer 82 between the plates 54, 56 to an extent of at least about fifty percent of its given thickness to transmute the preformed block of copolyester elastomer 82 into a spring 80, which spring, when subsequently put into service, as such will not suffer significant permanent deformation although a particular force is applied thereto and with the lobes 87 on the preformed block of copolyester elastomer 82 distributing elastomer toward the corners of the plates 54 and 56, and with the grippers 69, 79 on the plates 54, 56 engaging with the preformed block of copolyester elastomer 82 whereby resisting the flow of elastomer relative to the outer profile 60, 70 of the plates 54, 56, respectively.

Preferably, the method of manufacturing a railcar draft gear elastomeric spring unit further includes the further step of providing the plates 54, 56 of each spring unit 52 with a generally rectangular outer profile. A preferred method of manufacturing a railcar draft gear elastomeric spring unit 52 includes the further step of: configuring the plates 54, 56 of each spring unit to further define cooperating instrumentalities or interlocks 100 for facilitating stacking and general alignment of one spring unit 52 relative to another. Preferably, each gripper in the series of grippers 69, 79 defines steps angularly aligned relative to the surface of the plate 54, 56 from which the gripper extends. Moreover, each gripper in the series of grippers 69, 79 further defines an aperture 91 into which elastomer flows and is held during compression of the preform 82. A preferred method of manufacturing a railcar draft gear elastomeric spring unit includes the further step of: configuring each plate 54, 56 to further include a generally centralized inwardly turned flange 67 defining an aperture 68. The aperture 68 in the inwardly turned flange 67 is preferably sized to receive and permit a central projection 89 extending from the associated flat surface of the preform 82 to pass therethrough whereby forming a mechanical interlock with the inwardly turned flange 67.

A preferred method of manufacturing a railcar draft gear elastomeric spring unit includes the further step of: forming each spring unit from an elastomer having a Shore D durometer hardness ranging between about 38 and about 57. Preferably, the elastomer of each said spring unit 52 has a ratio of plastic strain to elastic strain greater than 1.5 to 1. In one form, each lobe 87 on the preformed block of copolyester elastomer 82 defines a slanted surface 97, 98 angling away from a respective flat surface 84, 86, respectively, for maintaining the surfaces 84, 86 generally flat after the preformed block of copolyester elastomer 82 has been compressed. A preferred method of manufacturing a railcar draft gear elastomeric spring unit includes the further step of: forming the preformed block of copolyester elastomer 82 to have a generally centralized projection 89 extending from each flat surface 84, 86.

From the foregoing, it will be observed that numerous modifications and variations can be made and effected without departing or detracting from the true spirit and novel concept of this invention disclosure. Moreover, it will be appreciated, the present disclosure is intended to set forth an exemplification which is not intended to limit the disclosure to the specific embodiment illustrated. Rather, this disclosure is intended to cover by the appended claims all such modifications and variations as fall within the spirit and scope of the claims.

What is claimed is:

1. A railcar draft gear spring assembly, comprising:
    an axial stack of springs units, with each spring unit including a spring formed from a non-circular preformed block of copolyester elastomer of a given thickness defined between a pair of generally parallel flat surfaces and having a series of spaced corners with sides extending between said corners, and wherein said preformed block of copolyester elastomer further includes a lobe formed at each corner for channeling the flow of elastomer and with recessed sides extending between any two lobes and such that when said preformed block of copolyester elastomer is compressed to an extent of at least about fifty percent of said given thickness said preformed block of copolyester elastomer transmutes into said spring which spring, when subsequently put into service, as such will not suffer significant permanent deformation although a particular force is applied thereto; and
    with each spring unit further including a non-circular metal plate arranged in operable combination with each of the generally parallel surfaces of said non-circular preformed block of copolyester elastomer, with each plate having an outer profile and a series of grippers extending in a common direction away from one surface of said plate, with said grippers being arranged in a predetermined pattern relative to each other and relative to said preform for initially positioning said non-circular preformed block of copolyester elastomer relative to said plate and for thereafter restricting the flow of elastomer relative to the outer profile of said plates.

2. The railcar draft gear spring assembly as defined in claim 1 wherein the plates of each spring unit each have a generally rectangular outer profile.

3. The railcar draft gear cushioning apparatus as defined in claim 1 wherein the elastomer each spring unit has a Shore D durometer hardness ranging between about 43 and about 55.

4. The railcar draft gear spring assembly as defined in claim 1 wherein the elastomer of each said spring unit has a ratio of plastic strain to elastic strain greater than 1.5 to 1.

5. The railcar draft gear spring assembly as defined in claim 1 wherein each lobe on said preformed block of copolyester elastomer defines a slanted surface angling away from a respective flat surface for maintaining said surfaces generally flat after said preformed block of copolyester elastomer has been compressed.

6. The railcar draft gear spring assembly as defined in claim 1 wherein the plates of each spring unit further define cooperating interlocks for facilitating stacking and general alignment of the spring units relative to each other.

7. The railcar draft gear spring assembly as defined in claim 1 wherein each gripper in said series of grippers define steps angularly aligned relative to the surface of the plate from which said gripper extends.

8. The railcar draft gear spring assembly as defined in claim 7 wherein each gripper in said series of grippers further defines an aperture into which elastomer flows and is held during axial compression of said preform.

9. A railcar draft gear spring assembly, comprising:
    a series of spring units arranged in stacked relation relative to each other, with each spring unit including a spring formed from a non-circular preformed block of copolyester elastomer of a given thickness defined between two generally flat opposed surfaces and having a series of spaced corners, and wherein said preformed block of copolyester elastomer has a generally centralized projection extending from each surface, and wherein said preformed block further includes recessed sides extending between any two corners of said preformed block of copolyester elastomer such that when said preformed block of copolyester elastomer is compressed to an extent of at least about fifty percent of said given thickness said preformed block of copolyester elastomer transmutes into said spring which spring, when subsequently put into service, as such will not suffer significant permanent deformation although a particular force is applied thereto; and with each spring unit further including a non-circular metal plate arranged in operable combination with each of the generally parallel surfaces of said non-circular preformed block of copolyester elastomer, with each plate having a longitudinal axis, an outer profile, and a series of grippers extending in a common direction from one surface of said plate, with at least two of said grippers being arranged to opposed lateral sides of said axis in a predetermined pattern relative to each other and relative to said preform for initially positioning said non-circular preformed block of copolyester elastomer relative to said plate and for thereafter restricting the flow of elastomer relative to the outer profile of said plates, and with each plate further including a generally centralized inturned flange defining an aperture, with said aperture in said flange being sized to receiving and permit the central projection extending from the associated flat surface of said preform to pass therethrough whereby forming a mechanical interlock with said inturned flange.

10. The railcar draft gear spring assembly as defined in claim 9 wherein the plates of each spring unit have a generally rectangular outer profile.

11. The railcar draft gear spring assembly as defined in claim 9 wherein two additional grippers are arranged on each plate in general alignment with said axis and relative to opposed ends of said preform for initially positioning said non-circular preformed block of copolyester elastomer relative to said plates and for thereafter restricting the flow of elastomer relative to the outer profile of said plates.

12. The railcar draft gear spring assembly as defined in claim 9 wherein the elastomer of each spring unit has a Shore D durometer hardness ranging between about 38 and about 57.

13. The railcar draft gear spring assembly as defined in claim 9 wherein the elastomer of each spring unit has a ratio of plastic strain to elastic strain greater than 1.5 to 1.

14. The railcar draft gear spring assembly as defined in claim 9 wherein each gripper in said series of grippers define steps angularly aligned relative to the surface of the plate from which said gripper extends.

15. The railcar draft gear spring assembly as defined in claim 9 wherein the plates of each spring unit further define cooperating interlocks for facilitating stacking and general alignments of the spring units relative to each other.

16. The railcar draft gear spring assembly as defined in claim 9 wherein each gripper in said series of grippers further defines an aperture into which elastomer flows and is held during axial compression of said preform.

17. The railcar draft gear spring assembly as defined in claim 9 wherein the preformed block of copolyester elastomer includes a lobe at each corner for distributing the elastomer relative to the outer profile of the plates during formation of said spring.

18. The railcar draft gear spring assembly as defined in claim 17 wherein each lobe on said preformed block of copolyester elastomer defines a slanted surface angling away from a respective flat surface for maintaining said surfaces generally flat after said preformed block of copolyester elastomer has been compressed.

19. A method of manufacturing a railcar draft gear elastomeric spring unit, comprising the steps of:
providing a first non-circular plate having first and second spaced and generally parallel planar surfaces, said non-circular first plate defining a longitudinal axis and a plurality of grippers arranged in a predetermined pattern relative to each other on said first plate, with at least two grippers being spaced equidistantly a predetermined lateral distance and to one lateral side of the longitudinal axis;
providing a second non-circular plate having third and fourth spaced and generally parallel planar surfaces, said non-circular second plate defining a longitudinal axis and a plurality of grippers arranged in a predetermined pattern relative to each other on said second plate, with at least two grippers being spaced equidistantly a predetermined lateral distance and to one lateral side of the longitudinal axis;
arranging a non-circular preformed block of copolyester elastomer of a given thickness defined between the second and fourth generally planar surfaces of said first and second plates, respectively, such that the grippers on said plates positions said non-circular preformed block of copolyester elastomer relative to said plates, with said non-circular preformed block of copolyester elastomer having a series of spaced corners, and wherein said preformed block of copolyester elastomer further has sides extending between said corners, and wherein said preformed block of copolyester elastomer further includes a lobe formed at each corner; and
compressing said preformed block of copolyester elastomer between said plates to an extent of at least about fifty percent of said given thickness to transmute said preformed block of copolyester elastomer into a spring which spring, when subsequently put into service, as such will not suffer significant permanent deformation although a particular force is applied thereto and with said lobes on said preformed block of copolyester elastomer balancing the distribution of elastomer toward the corners of said plates, and with the grippers on said plates engaging with the preformed block of copolyester elastomer resisting the flow of elastomer relative to the outer profile of said plates.

20. The method of manufacturing a railcar draft gear elastomeric spring unit according to claim 19 wherein the plates of each spring each have a generally rectangular outer profile.

21. The method of manufacturing a railcar draft gear elastomeric spring unit according to claim 19 wherein the elastomer each spring has a Shore D durometer hardness ranging between about 38 and about 57.

22. The method of manufacturing a railcar draft gear elastomeric spring unit according to claim 19 wherein the elastomer of each said spring has a ratio of plastic strain to elastic strain greater than 1.5 to 1.

23. The method of manufacturing a railcar draft gear elastomeric spring unit according to claim 19 wherein each lobe on said preformed block of copolyester elastomer defines a slanted surface angling away from a respective flat surface for maintaining said surfaces generally flat when said preformed block of copolyester elastomer is compressed.

24. The method of manufacturing a railcar draft gear elastomeric spring unit according to claim 19 wherein the plates of each spring unit further define cooperating interlocks for facilitating stacking and general alignment of one spring unit relative to each other.

25. The method of manufacturing a railcar draft gear elastomeric spring unit according to claim 19 wherein each gripper in said series of grippers define steps angularly aligned relative to the surface of the plate from which said gripper extends.

26. The method of manufacturing a railcar draft gear elastomeric spring unit according to claim 19 wherein each gripper in said series of grippers further defines an aperture into which elastomer flows and is held during compression of said preform.

27. The method of manufacturing a railcar draft gear elastomeric spring unit according to claim 19 wherein said preformed block of copolyester elastomer has a generally centralized projection extending from each flat surface.

28. The method of manufacturing a railcar draft gear elastomeric spring according to claim 27 wherein each plate further includes a generally centralized inturned flange defining an aperture, with said aperture in said flange being sized to receive and permit the central projection, extending from the associated flat surface of said preform, to pass therethrough, whereby forming a mechanical interlock with said inturned flange.

\* \* \* \* \*